(12) United States Patent
Hamann et al.

(10) Patent No.: US 7,235,178 B2
(45) Date of Patent: Jun. 26, 2007

(54) PROCESS AND ASSEMBLY FOR THE TREATMENT OF WASTE WATER ON SHIPS

(75) Inventors: Knud Hamann, Appel (DE); Holger Hamann, Seevetal (DE)

(73) Assignee: Hamann AG (DE)

( * ) Notice: Subject to any disclaimer, the term of this patent is extended or adjusted under 35 U.S.C. 154(b) by 223 days.

(21) Appl. No.: 10/974,373

(22) Filed: Oct. 27, 2004

(65) Prior Publication Data

US 2005/0098496 A1 May 12, 2005

(30) Foreign Application Priority Data

Nov. 11, 2003 (DE) ................. 103 52 636

(51) Int. Cl.
*C02F 3/30* (2006.01)
(52) U.S. Cl. ................. 210/623; 210/630; 210/903
(58) Field of Classification Search ............... 210/605, 210/621, 622, 623, 630, 903
See application file for complete search history.

(56) References Cited

U.S. PATENT DOCUMENTS

| | | | | |
|---|---|---|---|---|
| 3,440,166 A | * | 4/1969 | Davis et al. | 210/603 |
| 3,654,147 A | * | 4/1972 | Levin et al. | 210/625 |
| 3,994,803 A | * | 11/1976 | Neff et al. | 210/618 |
| 4,159,945 A | * | 7/1979 | Savage | 210/618 |
| 5,811,009 A | * | 9/1998 | Kos | 210/605 |
| 6,126,828 A | * | 10/2000 | Hasegawa et al. | 210/603 |
| 6,592,762 B2 | * | 7/2003 | Smith | 210/605 |

FOREIGN PATENT DOCUMENTS

| | | | |
|---|---|---|---|
| DE | 31 45 797 A1 | | 5/1983 |
| DE | 42 07 077 C2 | | 9/1992 |
| DE | 42 21 867 C2 | | 1/1994 |
| DE | 295 17 891 U1 | | 1/1996 |
| DE | 197 49 699 A1 | | 4/1999 |
| EP | 0 501 355 A1 | | 9/1992 |
| JP | 61-192396 | * | 8/1986 |

* cited by examiner

*Primary Examiner*—Fred G. Prince
(74) *Attorney, Agent, or Firm*—Peter J. Bilinski

(57) ABSTRACT

Process for treating waste water on ships in which the waste water is pretreated by surface filtration, the pretreated waste water being collected in a first tank acting as a mixing tank and optionally enriched with oxygen. The waste water from the first tank is continuously fed to a three stage bioreactor, in which aerobic waste water treatment takes place in a second tank, waste water is fed in batches from a second tank to a third sealed tank, in which denitrification and sedimentation of the solids takes place. Water from the third tank is fed into a fourth tank acting as a settling tank with the largest part of the sludge being recirculated in batches from the third tank into the first tank and, after disinfection, the water from the fourth tank is subjected to fine filtration.

6 Claims, 1 Drawing Sheet

PROCESS AND ASSEMBLY FOR THE TREATMENT OF WASTE WATER ON SHIPS

FIELD OF THE INVENTION

The invention relates to a process for treating waste water on ships.

BACKGROUND OF THE INVENTION

At present it is still commonplace for waste water produced on ships to be passed untreated into the sea. It is however also already known to subject waste water to a biological clarification process. A disadvantage in this case is that it is difficult to adapt it to the amount of waste water being produced, as waste water from ships is typically composed of different waste water streams which as a rule have widely fluctuating compounds. Furthermore, there is an insufficient breakdown of nitrates in such clarification processes. As a result, the clarified water is passed into the sea water with unacceptable levels of nitrates and nitrites.

A compact biological water clarification assembly is known from DE 197 49 699 A1. The assembly for treating waste water comprises a primary clarification stage, a biological clarification stage and a final clarification stage in a single container. The primary clarification tank itself consists of three tanks. Water enters the first tank from where the waste water is passed into a further primary clarification tank located below the first tank, from where the waste water is passed into the third primary clarification tank which is located in the vicinity of the second primary clarification tank. In the third primary clarification tank a rotating body is arranged with which, in this tank, part of the aerobic biological purification of the waste water is carried out.

A device is known from DE 31 45 797 A1 for biological waste water purification where, for the purification process, the waste water is fed in with vacuum suction by means of a liquid jet pump which is driven by a circulating water pump. A buffer tank into which the waste water first enters and which is connected to the suction side of the liquid jet pump is arranged in such a way that there is a vacuum cushion in the buffer tank. In this manner multiple use of toilets and/or waste water collection points are/is achieved and at the same time efficient aerobic breakdown of the contaminants is ensured.

A transportable compact clarification assembly is known from DE 295 17 891 U1, which is built into a welded structural steel container. It contains a two-stage bioreactor. The bioreactor working in the aeration process is connected via an intermediate clarification stage to a low load reactor containing a forced-aeration fixed bed cascade. The excess sludge is fed out of the post-clarification tank into a high load tank, which is connected in series to the bioreactor. The excess sludge from the intermediate sludge circuit between the intermediate clarification stage and the high load tank is discharged into an aerated sludge stabilization tank/sludge collector.

In DE 42 07 077 C2 a compact clarification assembly with a sludge recirculation element is disclosed. A rectangular tank is divided up into a pre-clarification tank, an aeration tank with an immersed aerator and a post-clarification tank. At least one liquid overflow device is provided between the aeration tank and the post-clarification tank. On the bottom of the aeration tank at a distance from the horizontal recirculation slot, guide elements are offset obliquely from one another and spaced apart along the width of the tank. At the lower end of the partition wall between the aeration tank and the post-clarification tank above the slot is a guide element, extending horizontally along the width of the tank and arranged obliquely downwards into the aeration tank.

A process and an assembly for the biological purification of waste water by targeted denitrification is known from DE 42 21 867 C2. The activated sludge withdrawn as excess sludge is disintegrated by a mechanical cell wall disintegration process into a disintegrated product and thus processed to an internally available source of hydrocarbon and metered specifically for denitrification. All the organic carbon of the waste water which can be biologically broken down is converted into the gas phase by continuous recirculation.

From EP 0 501 355 A1 a process is known for the anaerobic treatment of water, in particular for the microbial degradation of nitrates from drinking water. The raw water to be treated is passed via two fluidised bed reactors connected in series and in the operating state is transported with support material overgrown by biomass from a respective reactor stage into the following reactor stage. The support material is passed with the water stream leaving the last reactor into a separation unit from where the separated support material is recirculated into the first reactor stage. Depending on the pressure drop in the individual reactor stages the water to be treated can be passed via reactor stages staggered in height.

SUMMARY OF THE INVENTION

The object of the invention is to disclose a process for treating waste water on ships, in which a biological clarification process is carried out and nitrates are simultaneously removed from the clarified waste water, making the best possible use of the space available on a ship. Furthermore the amount of clarification sludge being produced which has to be supplied for further treatment or disposal is markedly reduced.

In the process according to the invention, waste water is pretreated by surface filtration. This is carried out, for example, by waste water under pressure being pressed through a screen, a filter fabric or the like, whereby coarse solid particles, for example hairs, fibres, plastic particles and coarse solids are removed. The filter cake can then be disposed of in a suitable manner, for example by incineration.

Filter devices to carry out this process step are known. The pretreated waste water is then passed into a first tank acting as a buffer. This has a volume which can preferably receive approximately four times the maximum amount of waste water which flows in per hour. The waste water can therefore be continually supplied to this tank from different parts of the ship. A mixture of different waste waters is found in this tank on ships, in particular 'grey water' and 'black water'. 'Grey water' is understood to mean, for example, the total waste water (excluding toilet waste water) from the kitchen, cleaning and accommodation areas. 'Black water' is waste water from the toilet area and the sick bay. Aeration preferably takes place in this first tank and therefore oxygenation and simultaneous turbulent mixing.

The waste water is continuously fed from the first tank into a bioreactor. The bioreactor comprises a second tank in which an aerobic waste water treatment takes place. By this is understood the reduction of the dirt load of waste water by aerobic digestion of organic compounds with the aid of micromechanisms and microorganisms (aerated sludge) with the aim of extensively reducing the oxygen-consuming compounds. Organic substances are metabolised by forming carbon dioxide, water, nitrates and sulphates by means of organisms involved in the digestion process. To supply aerobic waste water treatment, surface aerators, volume aerators or other means of forced aeration can, for example, be provided.

In the next step, a third tank is filled in batches with the waste water from the second tank. The third tank is sealed and is used for the denitrification process. By this is understood the reduction of nitrates and nitrites in waste water under anaerobic conditions. The denitrification takes place at the same time as the sedimentation of the solids and is carried out until the waste water has sufficient clarity. Thus according to an embodiment of the invention an opacimeter can be provided which determines when the opacity reaches a minimum level.

Then the sediment or sludge is recirculated from the third tank into the first tank. The amount of each batch for the third tank preferably corresponds to three times the amount which is fed per hour into the second tank. A level measurement device can be arranged on the second tank to determine this. By regularly recirculating the sedimented sludge to the third tank which is rich in denitrifying bacteria, the first tank is 'innoculated'. The relatively high oxygen concentration, however, causes a marked reduction in anaerobic bacteria (denitrifyers) within a few hours. Only by regular repeated 'innoculation' of the first tank can a mixed population of bacteria be produced which in the further operation can produce both rapid growth of aerobic bacteria (causing intensive breakdown of organic components) and sufficient density of anaerobic bacteria (denitrifyers).

The relatively clear water from the third tank is transferred into a settling tank and from there, after disinfection, for example by chemical means, is once again fine filtered before it is passed into the sea water.

The process according to the invention is a simple method of producing waste water which has been extensively purified of organic components and nitrogen compounds and as a result meets requirements for clean water.

According to an embodiment of the invention, it is provided that a flocculant is metered to the water before it enters the settling container. The sediment thus produced (excess sludge) as a rule corresponds to <5% of the volume flow and is disposed of in a manner known per se.

An assembly for carrying out the invention can partially rely on containers which are already present on a ship. This refers in particular to tanks or containers for mixing and for the aerobic waste water treatment. The remaining containers must additionally be installed on the ship. To keep the unused surfaces in the container to a minimum for the denitrification process and to achieve complete filling as well as optimum sedimentation, both the base and the lid are funnel-shaped.

The fine filtration is preferably membrane filtration which also can be carried out by means known per se. A particular advantage of the invention is that the fine filtration system is loaded only with very small amounts of solids, which results in the durability of the filter module and a reduction in maintenance costs. Moreover the required total tank capacity of the invention corresponds only to the daily (24 hours) regular waste water volume, as a continuous supply line to the treatment assembly can be produced and large buffer containers or collection tanks are not required, as are generally used in shipping at the present time. The size of the assembly according to the invention can therefore be kept small which corresponds to the naturally restricted space on ships.

DETAILED DESCRIPTION

Figure 1:
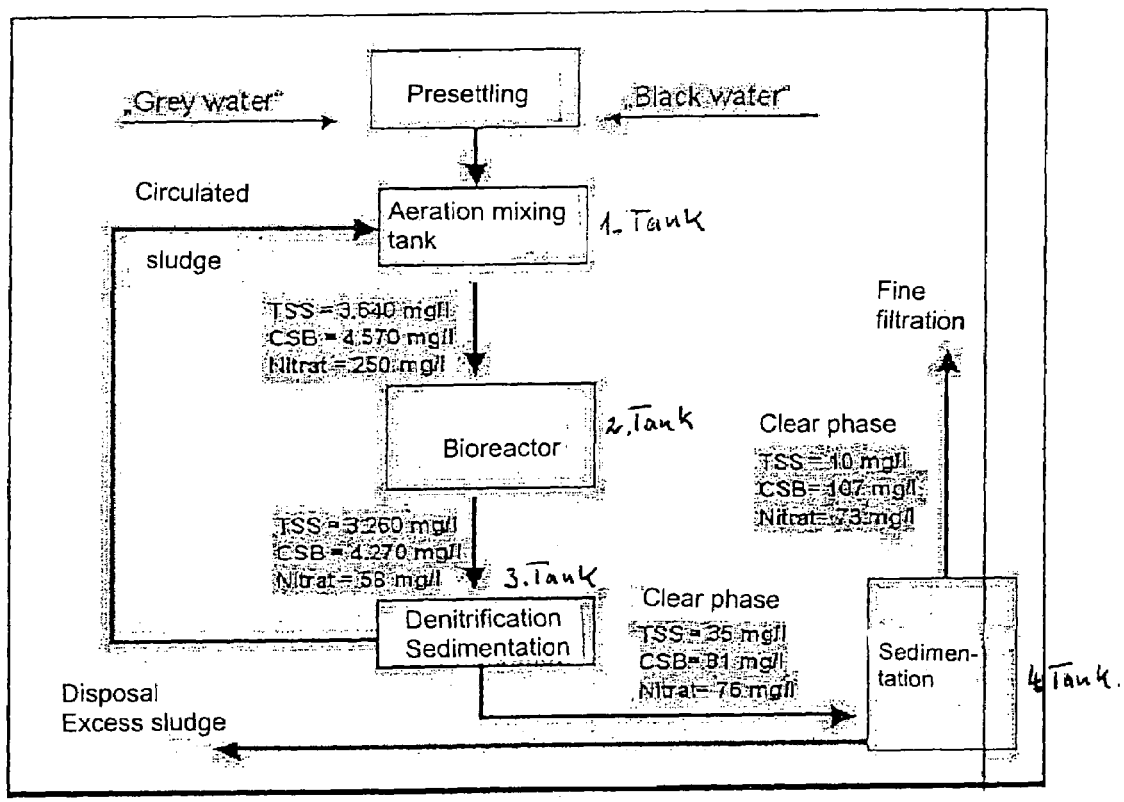
FIG. 1 illustrates a process diagram illustrating an assembly for carrying out the invention.

In the process according to the invention, waste water is pretreated by surface filtration. This is carried out, for example, by waste water under pressure being pressed through a screen, a filter fabric or the like, whereby coarse solid particles, for example hairs, fibres, plastic particles and coarse solids are removed. The filter cake can then be disposed of in a suitable manner, for example by incineration.

The waste water is continuously fed from the first tank into a bioreactor. The bioreactor comprises a second tank in which an aerobic waste water treatment takes place. By this is understood the reduction of the dirt load of waste water by aerobic digestion of organic compounds with the aid of micromechanisms and microorganisms (aerated sludge) with the aim of extensively reducing the oxygen consuming compounds. Organic substances are metabolised by forming carbon dioxide, water, nitrates and sulphates by means of organisms involved in the digestion process. To supply aerobic waste water treatment, surface aerators, volume aerators or other means of forced aeration can, for example, be provided.

In the next step, a third tank is filled in batches with the waste water from the second tank. The third tank is sealed and is used for the denitrification process. By this is understood the reduction of nitrates and nitrites in waste water under anaerobic conditions. The denitrification takes place at the same time as the sedimentation of the solids and is carried out until the waste water has sufficient clarity. Thus according to an embodiment of the invention an opacimeter can be provided which determines when the opacity reaches a minimum level.

Then the sediment or sludge is recirculated from the third tank into the first tank. The amount of each batch for the third tank preferably corresponds to three times the amount which is fed per hour into the second tank. A level measurement device can be arranged on the second tank to determine this. By regularly recirculating the sedimented sludge to the third tank which is rich in denitrifying bacteria, the first tank is 'innoculated'. The relatively high oxygen concentration, however, causes a marked reduction in anaerobic bacteria (denitrifyers) within a few hours. Only by regular repeated 'innoculation' of the first tank can a mixed population of bacteria be produced which in the further operation can produce both rapid growth of aerobic bacteria (causing intensive breakdown of organic components) and sufficient density of anaerobic bacteria (denitrifyers).

The relatively clear water from the third tank is transferred into a settling tank and from there, after disinfection, for example by chemical means, is once again fine filtered before it is passed into the sea water.

The process according to the invention is a simple method of producing waste water which has been extensively purified of organic components and nitrogen compounds and as a result meets requirements for clean water.

According to an embodiment of the invention, it is provided that a flocculant is metered to the water before it enters the settling container. The sediment thus produced (excess sludge) as a rule corresponds to <5% of the volume flow and is disposed of in a manner known per se.

An assembly for carrying out the invention can partially rely on containers which are already present on a ship. This refers in particular to tanks or containers for mixing and for the aerobic waste water treatment. The remaining containers must additionally be installed on the ship. To keep the unused surfaces in the container to a minimum for the denitrification process and to achieve complete filling as well as optimum sedimentation, both the base and the lid are funnel-shaped.

The fine filtration is preferably membrane filtration which also can be carried out by means known per se. A particular advantage of the invention is that the fine filtration system is loaded only with very small amounts of solids, which results in the durability of the filter module and a reduction in maintenance costs. Moreover the required total tank capacity of the invention corresponds only to the daily (24 hours) regular waste water volume, as a continuous supply line to the treatment assembly can be produced and large buffer containers or collection tanks are not required, as are generally used in shipping at the present time. The size of the assembly according to the invention can therefore be kept small which corresponds to the naturally restricted space on ships.

An embodiment for carrying out the process according to the invention is is shown in the process diagram of FIG. 1.

FIG.1 shows a diagram of an assembly for carrying out the process according to the invention with typical data on the content of TSS, CSB and Nitrates (in mg/l respectively), calculated as the long term average over a predetermined three month measuring period from In this case, TSS refers to Total Suspended Solids and CSB refers to Chemical Oxygen Requirement. The process steps are shown in the diagram without requiring further explanation.

We claim:

1. Process for treating waste water on ships, said method comprising the steps of:

pretreating the waste water by surface filtration;

collecting the pretreated waste water in a first container acting as a mixing tank and optionally enriched with oxygen;

continuously feeding the waste water from the first container to a bioreactor;

carrying out aerobic waste water treatment in a second container;

passing waste water from the second container to a third sealed container in batches, where denitrification takes place, water from the third container being fed into a fourth container acting as a settling container;

recirculating the sludge from the third container at regular intervals in batches into the first container; and after disinfection, subjecting the water from the fourth container to fine filtration.

2. Process according to claim 1, including the additional step of measuring the opacity of the water in the third container wherein the largest part of the sludge deposited in the third container is recirculated to the first container and by controlling the opacimeter, only the clear phase is transferred into the fourth container.

3. Process according to claim 1, wherein the batch fed into the third container corresponds approximately to three times the amount of waste water which is fed into the second container per hour.

4. Process according to claim 1, wherein a flocculant is metered to the waste water before entry into the fourth container.

5. Process according to claim 1, wherein the fine filtration is membrane filtration.

6. Process according to claim 1, wherein less than 5% of the treated volume flow is disposed of in the form of surplus sludge.

* * * * *

UNITED STATES PATENT AND TRADEMARK OFFICE
CERTIFICATE OF CORRECTION

| | | |
|---|---|---|
| PATENT NO. | : 7,235,178 B2 | Page 1 of 1 |
| APPLICATION NO. | : 10/974373 | |
| DATED | : June 26, 2007 | |
| INVENTOR(S) | : Knud Hamann et al. | |

It is certified that error appears in the above-identified patent and that said Letters Patent is hereby corrected as shown below:

In the SUMMARY, the following mistakes have been noted:

i) Col. 2, Lines 29 through 36 should be deleted in their entirety and inserted in their entirety into Col. 4, before Line 8.

ii) Col. 2, Lines 45 through 58 should be deleted in their entirety and inserted in their entirety into Col. 4, before Line 16.

In the DETAILED DESCRIPTION, the following mistakes have been noted:

i) Col. 5, Line 30. The words "three month measuring period from In this case," should be deleted and replaced with --three month measuring period. In this case,--.

Signed and Sealed this

Twenty-third Day of October, 2007

JON W. DUDAS
*Director of the United States Patent and Trademark Office*